US009731720B2

(12) United States Patent
Seo (10) Patent No.: US 9,731,720 B2
(45) Date of Patent: Aug. 15, 2017

(54) DISPLAY APPARATUS AND METHOD CONSIDERING A TRAVELING MODE OF A VEHICLE

(71) Applicant: Hyundai Mobis Co., Ltd., Seoul (KR)

(72) Inventor: Jung Hoon Seo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/932,168

(22) Filed: Nov. 4, 2015

(65) Prior Publication Data

US 2016/0121895 A1 May 5, 2016

(30) Foreign Application Priority Data

Nov. 5, 2014 (KR) ........................ 10-2014-0153088

(51) Int. Cl.
*B60R 99/00* (2009.01)
*B60W 30/18* (2012.01)
*B60W 50/14* (2012.01)

(52) U.S. Cl.
CPC ............ *B60W 30/18* (2013.01); *B60W 50/14* (2013.01); *B60R 2300/205* (2013.01); *B60R 2300/207* (2013.01); *B60R 2300/302* (2013.01); *B60R 2300/402* (2013.01); *B60R 2300/60* (2013.01); *B60W 2050/146* (2013.01); *B60W 2520/10* (2013.01)

(58) Field of Classification Search
CPC ............. B60W 30/18; B60R 2300/205; B60R 2300/207; B60R 2300/302–2300/308; B60R 2300/402; B60R 2300/60; G06T 3/20; G06T 3/4053
USPC ........................................ 701/36, 70, 93–98
See application file for complete search history.

(56) References Cited

U.S. PATENT DOCUMENTS

| | | | | |
|---|---|---|---|---|
| 4,831,366 A | * | 5/1989 | Iino ........................ | G02B 27/01 340/461 |
| 5,034,732 A | * | 7/1991 | Iino ........................ | G02B 27/01 340/980 |
| 5,646,639 A | * | 7/1997 | Koie ...................... | G02B 27/01 340/920 |

(Continued)

FOREIGN PATENT DOCUMENTS

| | | |
|---|---|---|
| JP | 2006-148347 | 6/2006 |
| JP | 2006-178667 | 7/2006 |
| JP | 2009-150947 | 7/2009 |
| JP | 2012-154749 | 8/2012 |
| JP | 5253734 | 7/2013 |
| JP | 5344069 | 11/2013 |

(Continued)

OTHER PUBLICATIONS

Office Action issued on Mar. 4, 2016, in Korean Patent Application No. 10-2014-0153088.

*Primary Examiner* — Tyler J Lee
(74) *Attorney, Agent, or Firm* — H.C. Park & Associates, PLC (57) ABSTRACT

Disclosed is a display apparatus which considers the speed and traveling mode of a vehicle. The display apparatus includes an information obtaining unit configured to obtain at least one of internal and external information about a vehicle, a control unit configured to process the information obtained by the information obtaining unit into a single image or a plurality of images by using a single image generator and control the image to be changed according to a traveling mode of the vehicle, and a display unit configured to display the image or the plurality of images.

12 Claims, 7 Drawing Sheets

(56) References Cited

U.S. PATENT DOCUMENTS

| | | | | |
|---|---|---|---|---|
| 6,553,308 | B1* | 4/2003 | Uhlmann | B61L 29/24 340/988 |
| 7,561,966 | B2* | 7/2009 | Nakamura | G01C 21/365 340/461 |
| 7,995,079 | B2* | 8/2011 | Bells | G03B 17/00 345/660 |
| 8,653,961 | B2* | 2/2014 | Kumon | G02B 27/01 340/425.5 |
| 8,675,283 | B2 | 3/2014 | Fujikawa et al. | |
| 2005/0154505 | A1* | 7/2005 | Nakamura | G01C 21/365 701/1 |
| 2007/0279317 | A1* | 12/2007 | Matsumoto | B60K 35/00 345/7 |
| 2009/0018711 | A1* | 1/2009 | Ueda | G08G 1/165 701/1 |
| 2009/0160736 | A1 | 6/2009 | Shikita | |
| 2011/0073773 | A1* | 3/2011 | Labrot | B32B 17/10 250/461.1 |
| 2012/0229596 | A1* | 9/2012 | Rose | G06T 3/4038 348/36 |
| 2016/0086305 | A1* | 3/2016 | Watanabe | B60K 35/00 345/672 |
| 2016/0321920 | A1* | 11/2016 | Hayasaka | G08G 1/166 |

FOREIGN PATENT DOCUMENTS

| | | |
|---|---|---|
| KR | 10-2010-0011704 | 2/2010 |
| KR | 10-2012-0062521 | 6/2012 |
| KR | 10-1361095 | 2/2014 |
| WO | 2004/066139 | 8/2004 |

\* cited by examiner

ASPHERICAL MIRROR

NORMAL MODE DISPLAY

DISPLAY APPARATUS AND METHOD CONSIDERING A TRAVELING MODE OF A VEHICLE

CROSS-REFERENCE TO RELATED APPLICATION

This application claims priority from and the benefit of Korean Patent Application No. 10-2014-0153088 filed on Nov. 5, 2014, which is hereby incorporated by reference for all purposes as if fully set forth herein.

BACKGROUND

Field

Exemplary embodiments relate to a display apparatus and method considering a traveling mode of a vehicle. More particularly, exemplary embodiments relate to a display apparatus and method which considers the speed and traveling mode of a vehicle and displays an image displayed on a display apparatus provided in a vehicle in a different manner according to a traveling mode of the vehicle.

Discussion of the Background

Presently, consumers in the vehicle market seek variety, such as a technology for improving the performance of a vehicle itself, vehicle design technology, and technology for devices inside a vehicle. Recently, research on technologies for a display apparatus inside a vehicle, such as a head up display, has been actively conducted.

The head up display is a device projecting a virtual image into a visual area of a driver in a vehicle. The virtual image projected into the visible area of the driver may vary according to devices installed in the vehicle. Further, the virtual image projected into the visible area of the driver may vary according to information required by the driver, such as cruise control, active cruise, navigation, a traveling speed, and a check control messages.

The head up display provides information within the visible area of a driver, so that a driver may reduce the time spent alternately watching the vehicle gauges and the road, thereby concentrating more on road traffic. Accordingly, the head up display contributes to reducing the fatigue of a driver and improving traveling safety.

The head up display having a single image generator in the related art, provides a driver with an image having only a single projection distance and a single magnification. When the head up display provides a driver with a plurality of elements travel with a single projection distance and magnification, there is a problem in that a display area is limited because the driver is limited to a single visible angle. Further, in order to provide the driver with a plurality of images, a plurality of image generators is required, and thus there is a problem in that the size, manufacturing cost, and the like, of the head up display is increased.

The head up display in the related art projects an image by using a liquid crystal display (LCD) panel method or a digital light processing (DLP) panel method, which provides a fixed projection distance, so that it is difficult to provide a driver with a plurality of images having different projection distances or magnifications.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a driver with images having a plurality of projection distances and a plurality of magnifications through a display apparatus including a single image generator.

Additional aspects will be set forth in the detailed description which follows, and, in part, will be apparent from the disclosure, or may be learned by practice of the inventive concept.

The present specification has also been made in an effort to provide a driver with an image by varying a size, a position, and resolution of an image, the number of images, and a projection distance and a magnification of an image according to a traveling mode of a vehicle.

An exemplary embodiment of the present specification provides a display apparatus, including: an information obtaining unit configured to obtain at least one of internal and external information about a vehicle; a control unit configured to process the information obtained by the information obtaining unit into a single image or a plurality of images by using a single image generator, and control the image to be changed according to a traveling mode of the vehicle; and a display unit configured to display the single image or the plurality of images.

When a current vehicle speed is equal to or higher than a predetermined vehicle speed, the control unit may set the traveling mode of the vehicle to a high speed traveling mode. When the current vehicle speed is lower than a predetermined vehicle speed, the control unit may set the traveling mode of the vehicle to a low speed traveling mode.

The control unit may correct distortion of the image according to a traveling mode of the vehicle, or when the traveling mode of the vehicle is the high speed traveling mode, the control unit may control a size of the image to be changed to be larger than a case where the traveling mode of the vehicle is the low speed traveling mode.

When the traveling mode of the vehicle is the high speed traveling mode, the control unit may control the number of displayed images to be smaller than that in the case where the traveling mode of the vehicle is the low speed traveling mode.

The control unit may control a position of a display area of the image to be changed according to the traveling mode of the vehicle.

When the traveling mode of the vehicle is the low speed traveling mode, the control unit may control the resolution of the image to be changed to be higher than that in the case where the traveling mode of the vehicle is the high speed traveling mode.

When the traveling mode of the vehicle is the low speed traveling mode, the display unit may vary projection distances of a plurality of images displayed on the screen of the vehicle for each image.

When the traveling mode of the vehicle is the low speed traveling mode, the display unit may vary the magnifications of a plurality of images displayed on the screen of the vehicle for each image.

When the traveling mode of the vehicle is the low speed traveling mode, the display unit may vary the magnifications of a plurality of images displayed on the screen of the vehicle for each image through a single aspherical mirror.

Another exemplary embodiment of the present invention provides a display method, including: obtaining at least one of internal and external information about a vehicle; processing the obtained information into a single image or a plurality of images by using a single image generator;

changing the image according to a traveling mode of the vehicle; and displaying a changed image according to the traveling mode of the vehicle.

The display method may further include when a current vehicle speed is equal to or higher than a predetermined vehicle speed, setting the traveling mode of the vehicle to a high speed traveling mode, and when the current vehicle speed is lower than the predetermined vehicle speed, setting the traveling mode of the vehicle to a low speed traveling mode.

The processing of the obtained information may include correcting distortion of the image according to a traveling mode of the vehicle, or when the traveling mode of the vehicle is the high speed traveling mode, changing a size of the image to be larger than a case where the traveling mode of the vehicle is the low speed traveling mode.

When the traveling mode of the vehicle is the high speed traveling mode, the processing of the obtained information may include changing the number of displayed images to be smaller than that in the case where the traveling mode of the vehicle is the low speed traveling mode.

The changing of the image may include changing a position of a display area of the image according to the traveling mode of the vehicle.

When the traveling mode of the vehicle is the low speed traveling mode, the changing of the image may include changing resolution of the image to be higher than that in the case where the traveling mode of the vehicle is the high speed traveling mode.

When the traveling mode of the vehicle is the low speed traveling mode, the displaying of the image may include varying projection distances of a plurality of images displayed on the screen of the vehicle for each image.

When the traveling mode of the vehicle is the low speed traveling mode, the displaying of the image may include varying magnifications of a plurality of images displayed on the screen of the vehicle for each image.

When the traveling mode of the vehicle is the low speed traveling mode, the displaying of the image may include varying magnifications of a plurality of images displayed on the screen of the vehicle for each image through a single aspherical mirror.

According to the exemplary embodiments of the present specification, it is possible to provide a driver with images having a plurality of projection distances and a plurality of magnifications through a display apparatus including a single image generator.

According to the exemplary embodiments of the present specification, it is possible to provide a driver with an image by varying a size, position, resolution, projection distance, and magnification of an image, and the number of images, and a projection distance and a magnification of an image according to a traveling mode of a vehicle.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of screens, panels, regions, etc., may be exaggerated for clarity and descriptive purposes. Also, like reference numerals denote like elements.

When an element is referred to as being "on," "connected to," or "coupled to" another element, it may be directly on, connected to, or coupled to the other element or layer or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, layer, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, a display apparatus according to an exemplary embodiment of the present specification will be described with reference to FIGS. 1, and 3 to 7.

Figure 1:
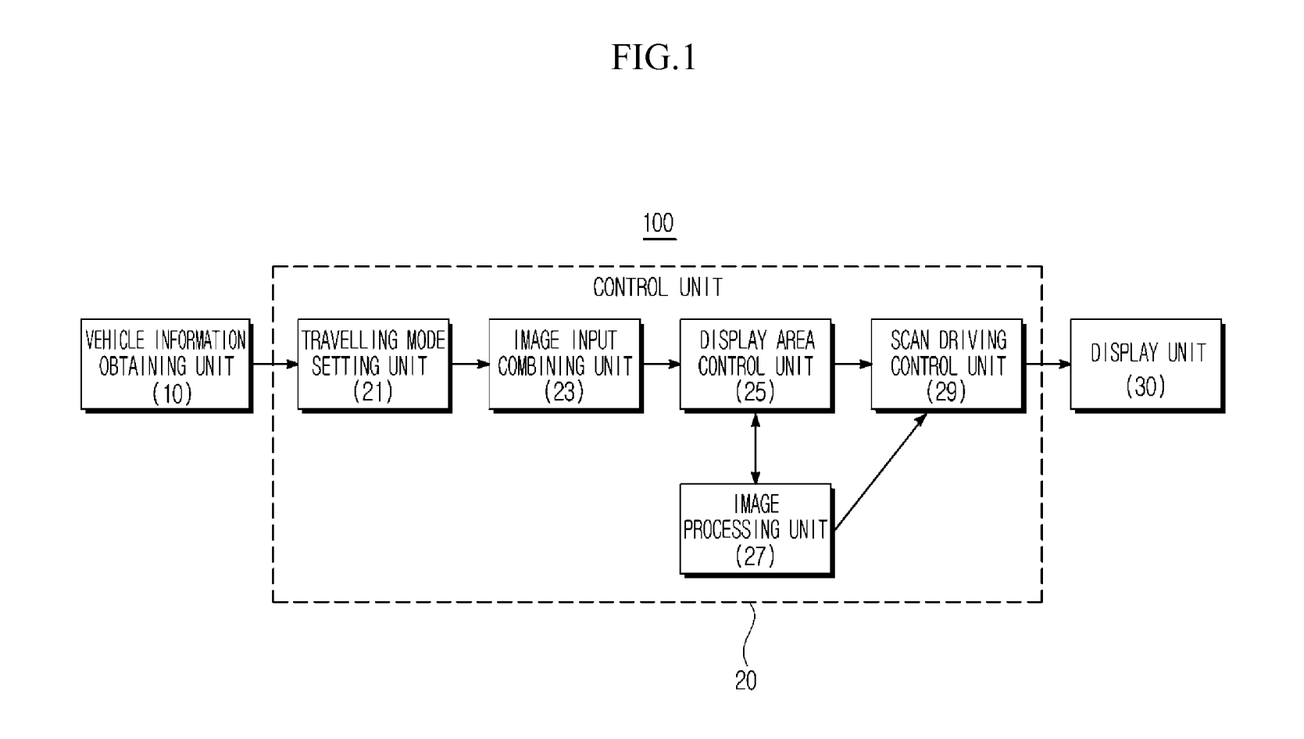
FIG. 1 is a block diagram of a display apparatus which considers a traveling mode of a vehicle according to an exemplary embodiment of the present specification.

FIG. 1 is a block diagram of a display apparatus which considers a traveling mode of a vehicle according to an exemplary embodiment of the present specification.

Referring to FIG. 1, a display apparatus 100 according to an exemplary embodiment of the present specification includes a vehicle information obtaining unit 10, a control unit 20, and a display unit 30.

The vehicle information obtaining unit 10 refers to a series of devices which obtain internal and/or external information about a vehicle. The internal information about the vehicle may mean a speed of the vehicle, steering angle information, information of a navigation device installed in the vehicle, and the like. Further, the external information about the vehicle may mean information about a mobile terminal, current location information about a surrounding area of a vehicle, and the like.

The control unit 20 processes the information obtained by the information obtaining unit 10 into a single image or a plurality of images by using a single image generator, and controls the image to be changed according to a traveling mode of the vehicle.

In this case, the single image generator includes an image generator adopting a laser scanning method.

The control unit 20 includes a traveling mode setting unit 21, an image input combining unit 23, a display area control unit 25, an image processing unit 27, and a scanner driving control unit 29.

When a current vehicle speed is equal to or higher than a predetermined vehicle speed, the traveling mode setting unit 21 sets a traveling mode of the vehicle to a high speed traveling mode. When the current vehicle speed is lower than a predetermined vehicle speed, the traveling mode setting unit 21 may set a traveling mode of the vehicle to a low speed traveling mode.

For example, when the predetermined vehicle speed is 80 KPH (Km/h), and the current vehicle speed is 70 KPH, the traveling mode of the vehicle is set to a low speed traveling mode. However, when the current vehicle speed is 90 KPH, the traveling mode of the vehicle is set to a high speed traveling mode.

The traveling mode of the vehicle may be set to be changed by other variable values of the vehicle, as well as the speed of the vehicle.

The image input combining unit 23 generates an optimal image currently required by a driver by selecting or combining the internal and/or external information about the vehicle obtained by the vehicle information obtaining unit 10.

The display area control unit 25 changes a position of a display area of the image according to the traveling mode of the vehicle.

Figure 3:
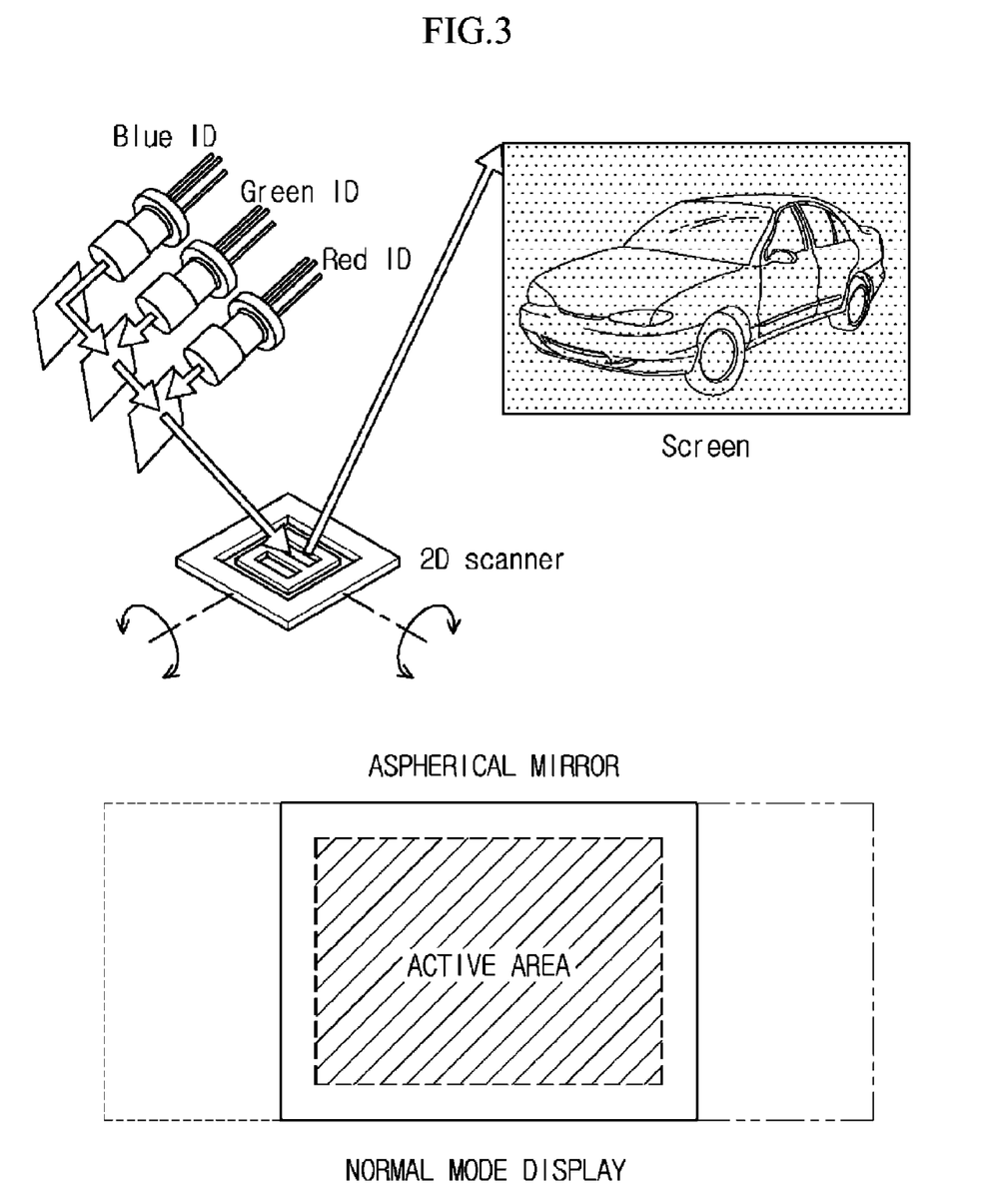
FIG. 3 is an explanatory diagram illustrating a display of an image in a high speed traveling mode by the display apparatus according to an exemplary embodiment of the present specification.

FIG. 3 is an explanatory diagram illustrating a display of an image in the high speed traveling mode by the display apparatus according to an exemplary embodiment of the present specification.

Figure 4:
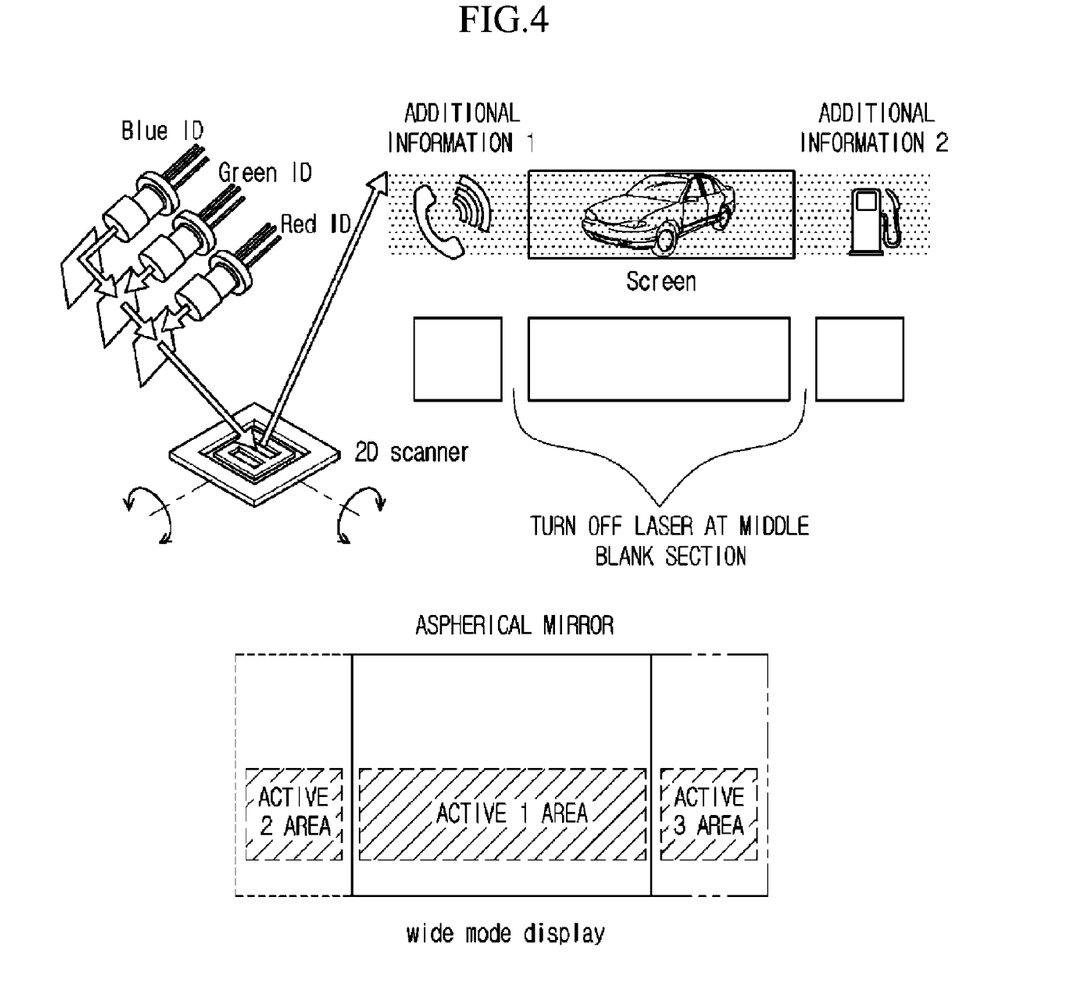
FIG. 4 is an explanatory diagram illustrating a display of an image in a low speed traveling mode by the display apparatus according to an exemplary embodiment of the present specification.

FIG. 4 is an explanatory diagram illustrating a display of an image in the low speed traveling mode by the display apparatus according to an exemplary embodiment of the present specification.

Referring to FIG. 3, when a current traveling mode of the vehicle is a high speed traveling mode, only speed information about the vehicle may be displayed at a center of a screen. Further, referring to FIG. 4, when a current traveling mode of the vehicle is a low speed traveling mode, speed information about the vehicle may be displayed at the center of the screen, and mobile terminal information and the like may be displayed on a left or right side and the like of the vehicle information about the vehicle.

The image processing unit 27 may correct distortion of the image according to a traveling mode of the vehicle. Further, when the traveling mode of the vehicle is a high speed traveling mode, the image processing unit 27 may change a size of the image to be larger than that in the case where the traveling mode of the vehicle is a low speed traveling mode.

When the traveling mode of the vehicle is the low speed traveling mode, the scanner driving control unit 29 may change resolution of the image to be higher than that in the case where the traveling mode of the vehicle is the high speed traveling mode. For example, the scanner driving control unit 29 may set the resolution to 800×480 when the traveling mode of the vehicle is the high speed traveling mode, and the scanner driving control unit 29 may set the resolution to be changed to 1,600×240 when the traveling mode of the vehicle is changed to the low speed traveling mode.

When the traveling mode of the vehicle is a high speed traveling mode, the control unit 20 may change the number of displayed images to be smaller than that in the case where the traveling mode of the vehicle is a low speed traveling mode. For example, the number of displayed images may be set to be 1 when the traveling mode of the vehicle is a high speed traveling mode, and the number of displayed images may be set to be 3 when the traveling mode of the vehicle is a low speed traveling mode. In addition, the number of displayed images may be changed according to the traveling mode of the vehicle.

The display unit 30 refers to a device displaying an image. In this case, the display unit 30 includes a multi-transmissive screen and an aspherical mirror.

The display unit 30 may vary a projection distance of an image displayed on the screen of the vehicle for each image when the traveling mode of the vehicle is the low speed traveling mode.

Figure 5A:
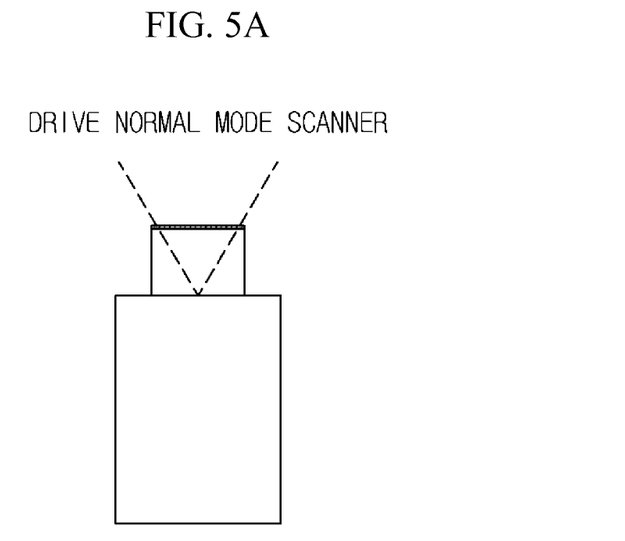
FIGS. 5A and 5B are explanatory diagrams illustrating a display of an image by varying a projection distance of an image according to a traveling mode by the display apparatus according to an exemplary embodiment of the present specification.
Figure 5B:
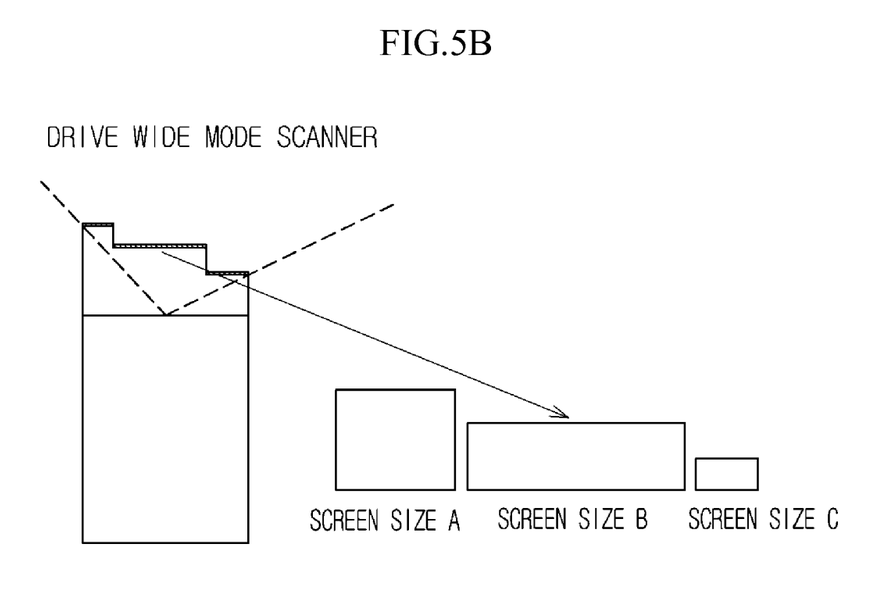

FIGS. 5A and 5B are explanatory diagrams illustrating a display of an image by varying a projection distance of the image according to a traveling mode by the display apparatus according to an exemplary embodiment of the present specification.

Referring to FIG. 5A, when an existing transmissive screen is used, an image displayed on the screen of the vehicle has only a single projection distance. However, referring to FIG. 5B, when a multi-transmissive screen is used, an image displayed on the screen of the vehicle may have a plurality of projection distances. In this case, the multi-transmissive screen and the screen of the vehicle mean different display apparatuses.

The display unit 30 may vary a magnification of an image displayed on the screen of the vehicle for each image when the traveling mode of the vehicle is the low speed traveling mode.

Figure 6:
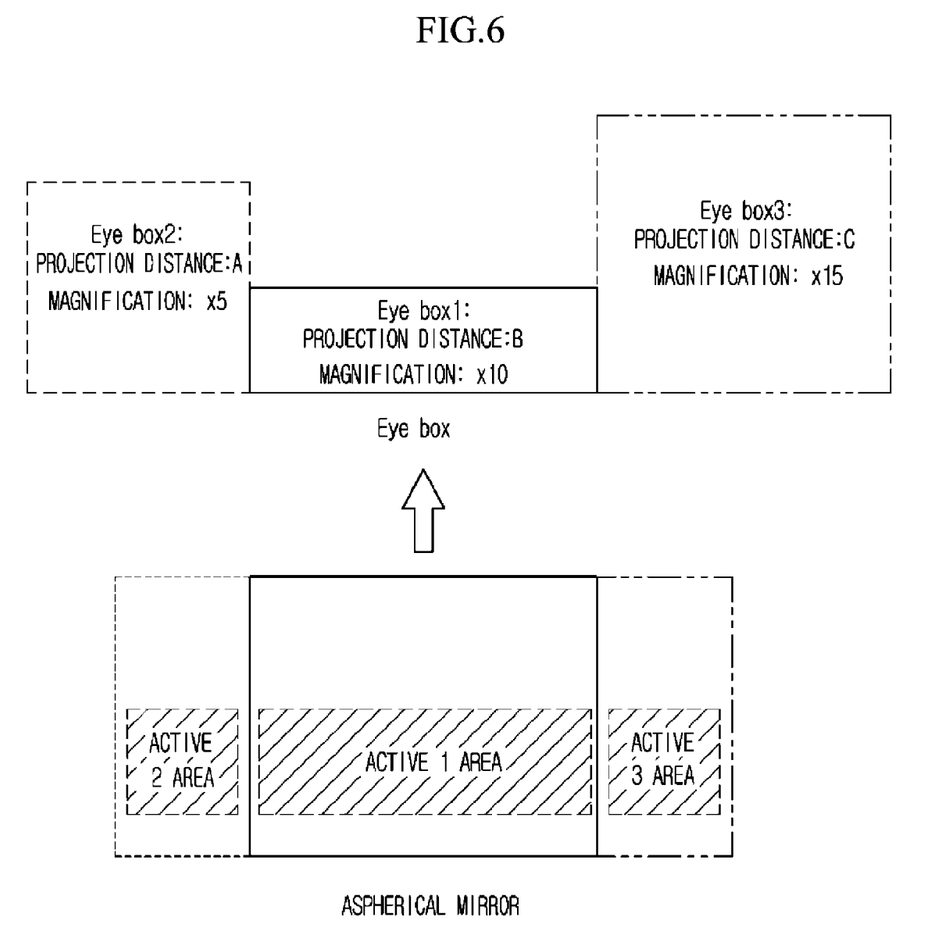
FIG. 6 is an explanatory diagram illustrating a display of a plurality of images on a screen of a vehicle by varying a projection distance and magnification by the display apparatus according to an exemplary embodiment of the present specification.

FIG. 6 is an explanatory diagram illustrating a display of a plurality of images on a screen of a vehicle by varying a projection distance and a magnification by the display apparatus according to an exemplary embodiment of the present specification.

Referring to FIG. 6, an image of an active 1 area displayed on an aspherical mirror is displayed on eye box 1 of the screen of the vehicle in the form having a projection distance B and a magnification×10. Further, an image of an active 2 area displayed on the aspherical mirror is displayed on eye box 2 of the screen of the vehicle in the form having a projection distance A and a magnification×5. Further, it can be seen that an image of an active 3 area displayed on the aspherical mirror is displayed on eye box 3 of the screen of the vehicle in the form having a projection distance C and a magnification×15. This is illustrative, and a magnification and a projection distance of each image may be varied.

Figure 7A:
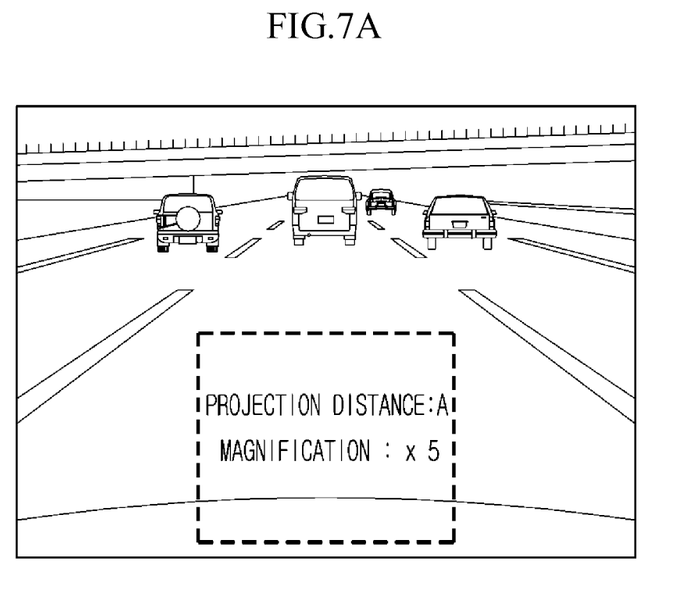
FIGS. 7A and 7B are example diagrams illustrating a display of an image by varying a size, position, resolution, projection, and magnification of an image, and number of images according to a traveling mode by the display apparatus according to the exemplary embodiment of the present specification.
Figure 7B:
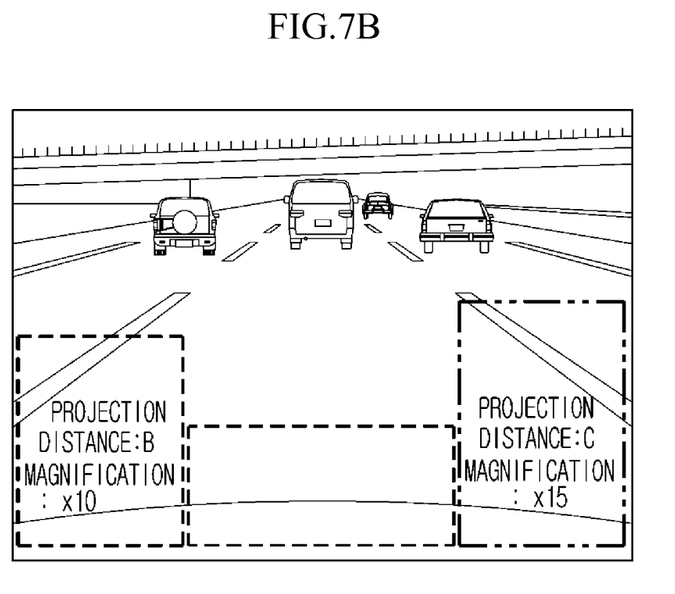

FIGS. 7A and 7B are example diagrams illustrating a display of an image by varying a size, position, resolution, projection, and magnification of an image, and number of images according to a traveling mode by the display apparatus according to the exemplary embodiment of the present specification.

Referring to FIG. 7A, when the traveling mode of the vehicle is a high speed traveling mode, a visible angle of a driver is small and a focus is far from the vehicle. Accordingly, FIG. 7A illustrates a display of only a single image.

Referring to FIG. 7B, when the traveling mode of the vehicle is a low speed traveling mode, a visible angle of a driver is large and a focus is close to the vehicle. Accordingly, FIG. 7B illustrates a display of the plurality of images having different projection distances and magnifications.

Hereinafter, a display method according to an exemplary embodiment of the present specification will be described with reference to FIG. 2.

Figure 2:
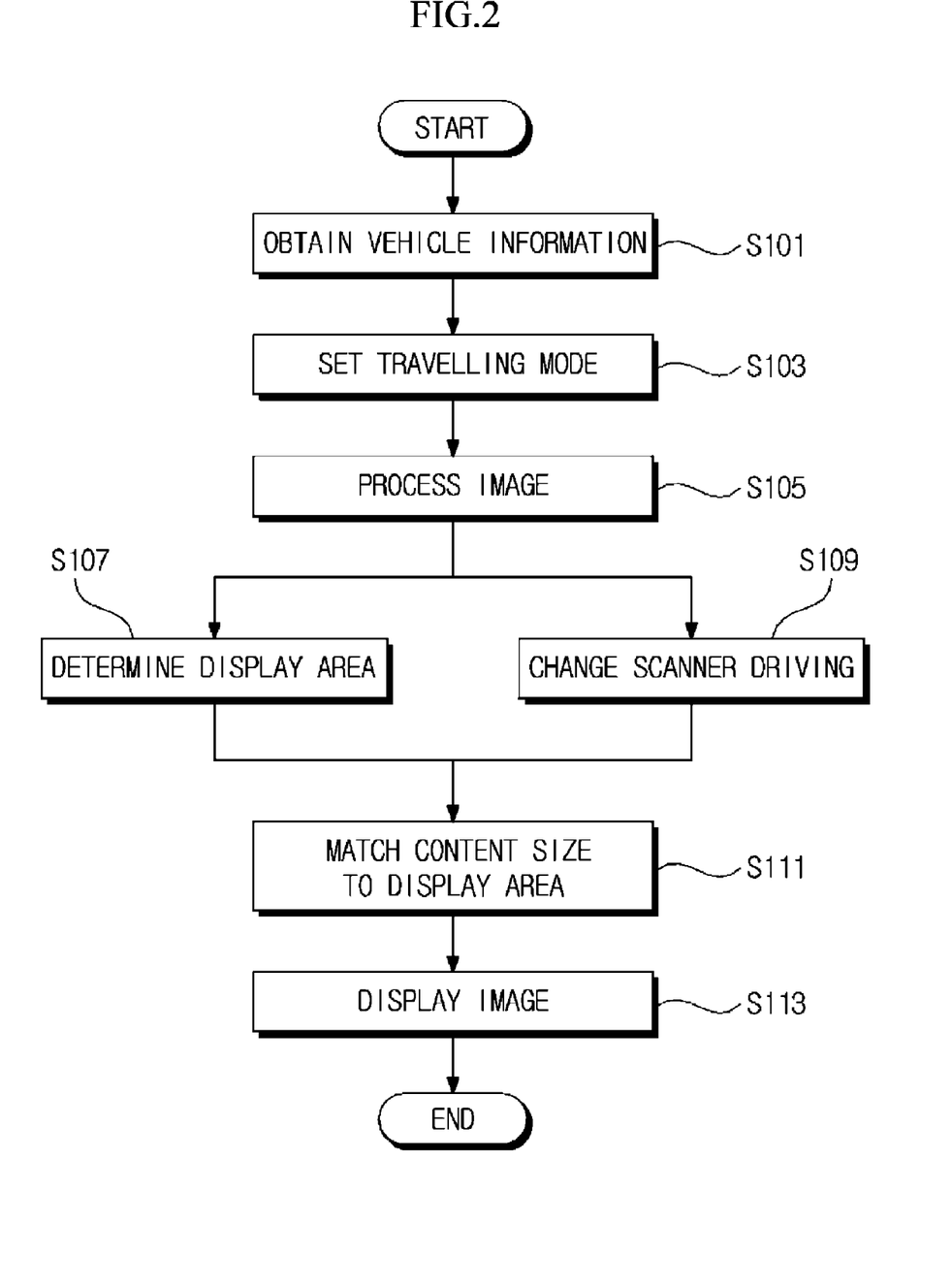
FIG. 2 is a flowchart of a display method which considers a traveling mode of a vehicle according to an exemplary embodiment of the present specification.

FIG. 2 is a flowchart of a display method considering a traveling mode of a vehicle according to an exemplary embodiment of the present specification.

Referring to FIG. 2, in the display method according to the exemplary embodiment of the present specification, first, internal and/or external information about a vehicle is obtained from the vehicle information obtaining unit 10 (S101).

The internal information about the vehicle may mean, for example, a speed of the vehicle, steering angle information, information of a navigation device installed in the vehicle, and the like. Further, the external information about the vehicle may mean, for example, information about a mobile terminal, current location information about a surrounding area of a vehicle, and the like.

Then, the control unit 20 sets a traveling mode of the vehicle (S103). When a current vehicle speed is equal to or higher than a predetermined vehicle speed, the control unit 20 may set the traveling mode of the vehicle to a high speed traveling mode, and when the current vehicle speed is lower than the predetermined vehicle speed, the control unit 20 may set the traveling mode of the vehicle to a low speed traveling mode.

For example, when the predetermined vehicle speed is 80 KPH (Km/h), and the current vehicle speed is 70 KPH, the traveling mode of the vehicle is set to a low speed traveling mode. Further, when the current vehicle speed is 90 KPH, the traveling mode of the vehicle is set to a high speed traveling mode.

The traveling mode of the vehicle may be set to be changed by other variable values of the vehicle, as well as the speed of the vehicle.

Then, the control unit 20 processes the information obtained in operation S101 into a single image or a plurality of images (S105).

An optimal image currently required by a driver is generated by selecting or combining the internal and/or external information about the vehicle obtained by the vehicle information obtaining unit 10 in operation S105.

Distortion of the image may be corrected according to a traveling mode of the vehicle. Further, when the traveling mode of the vehicle is a high speed traveling mode, a size of the image may be changed to be larger than that in a case where a traveling mode of the vehicle is the low speed traveling mode.

When the traveling mode of the vehicle is a high speed traveling mode, the number of displayed images may be changed to be smaller than that in the case where the traveling mode of the vehicle is a low speed traveling mode. For example, the number of displayed images may be set to be 1 when the traveling mode of the vehicle is a high speed traveling mode, and the number of displayed images may be set to be 3 when the traveling mode of the vehicle is a low speed traveling mode. In addition, the number of displayed images may be changed according to the traveling mode of the vehicle.

Then, the control unit 20 changes a position of a display area of the image according to the traveling mode of the vehicle (S107). For example, when a current traveling mode of the vehicle is a high speed traveling mode, speed information about the vehicle may be displayed at the center of the screen, and mobile terminal information and the like may be displayed on a left or right side and the like of the vehicle information about the vehicle.

The control unit 20 changes resolution of a scanner according to the traveling mode of the vehicle (S109). When the traveling mode of the vehicle is a low speed traveling mode, the resolution of the image may be changed to be higher than that in the case where the traveling mode of the vehicle is the high speed traveling mode. For example, the resolution may be set to 800×480 when the traveling mode of the vehicle is a high speed traveling mode, and the resolution may be set to be changed to 1,600×240 when the traveling mode of the vehicle is changed to a low speed traveling mode.

In this case, a different image may be displayed on a changed area while the traveling mode is changed from a low speed traveling mode to a high speed traveling mode. The images may be set to be discriminated by putting a blank between the images displayed in a low speed traveling mode. The blank may be generated between the images by turning off a laser diode between the images through a laser scanning image generator.

Then, the control unit 20 matches the display area set in operation S107 with the image (S111).

Then, the display unit 30 displays the image on the screen of the vehicle (S113).

In this case, when the traveling mode of the vehicle is a low speed traveling mode, the image may be displayed on the screen of the vehicle by changing the projection distance of the image to have a plurality of projection distances.

When the traveling mode of the vehicle is a low speed traveling mode, the image may be displayed on the screen of the vehicle by changing the magnification of the image to be different for each image.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display apparatus for a vehicle, the display apparatus comprising:
   a display comprising a screen;
   one or more devices configured to obtain at least one of internal and external information about a vehicle; and
   a control unit, comprising at least one processor, configured to:
      process the internal and/or external information into a single image or a plurality of images by using an image generator, and control the single image or the plurality of images to be changed according to a traveling mode of the vehicle,
      correct distortion of the image according to the traveling mode of the vehicle, or when the traveling mode of the vehicle is the high speed traveling mode, the control unit is configured to control a size of the single image or the plurality of images to be changed to be larger than when the traveling mode of the vehicle is the low speed traveling mode, and
      send the single image or the plurality of images to the display;
   wherein a resolution of the single image or the plurality of images is higher when the vehicle is a low speed traveling mode than when the vehicle is in a high speed traveling mode,
   when the traveling mode of the vehicle is the low speed traveling mode, the plurality of images are sent to the display, with varied projection distances of the plurality of images displayed on the screen of the vehicle for each image, and
   when a current vehicle speed is equal to or higher than a predetermined vehicle speed, the control unit is configured to set the traveling mode of the vehicle to the high speed traveling mode, and when the current vehicle speed is lower than a predetermined vehicle speed, the control unit is configured to set the traveling mode of the vehicle to the low speed traveling mode.

2. The display apparatus of claim 1, wherein when the traveling mode of the vehicle is the high speed traveling mode, the control unit is configured to control a number of displayed images to be changed to be smaller than when the traveling mode of the vehicle is the low speed traveling mode.

3. The display apparatus of claim 1, wherein the control unit is configured to control a position of a display area of the single image or the plurality of images to be changed according to the traveling mode of the vehicle.

4. The display apparatus of claim 1, wherein when the traveling mode of the vehicle is the low speed traveling mode, the display varies magnifications of a plurality of images displayed on the screen of the vehicle for each image.

5. The display apparatus of claim 1, wherein the display comprises a head up display (HUD) projecting a virtual image into a visible area of a driver.

6. The display apparatus of claim 5, wherein the HUD comprises a digital light processing (DLP) panel.

7. A display method, comprising:
   obtaining internal or external information about a vehicle,
   processing the obtained information into a single image or a plurality of images by using an image generator,
   correcting distortion of the single image or the plurality of images according to the traveling mode of the vehicle, or when the traveling mode of the vehicle is the high speed traveling mode, changing a size of the single image or the plurality of images to be larger than when the traveling mode of the vehicle is the low speed traveling mode,
   changing the single image or the plurality of images according to a traveling mode of the vehicle, and
   displaying a changed image according to the traveling mode of the vehicle;
   wherein a resolution of the changed image is higher when the travelling mode of the vehicle is a low speed traveling mode than when the travelling mode of the vehicle is a high speed traveling mode,
   when the traveling mode of the vehicle is the low speed traveling mode, displaying the plurality of images and varying projection distances of the plurality of images displayed on the screen of the vehicle for each image, and
   when a current vehicle speed is equal to or higher than a predetermined vehicle speed, setting the traveling mode of the vehicle to the high speed traveling mode, and when the current vehicle speed is lower than the predetermined vehicle speed, setting the traveling mode of the vehicle to the low speed traveling mode.

8. The display method of claim 7, wherein the processing of the obtained information comprises, when the traveling mode of the vehicle is the high speed traveling mode, changing a number of displayed images to be smaller than when the traveling mode of the vehicle is the low speed traveling mode.

9. The display method of claim 7, wherein the changing of the image comprises changing a position of a display area of the changed image according to the traveling mode of the vehicle.

10. The display method of claim 7, wherein the displaying of the changed image comprises, when the traveling mode of the vehicle is the low speed traveling mode, displaying the plurality of images and varying magnifications of the plurality of images displayed on the screen of the vehicle for each image.

11. The display method of claim 7, wherein a head up display (HUD) projecting a virtual image into a visible area of a driver displays the changed image.

12. The display method of claim 11, wherein a digital light processing (DLP) panel projects the virtual image.

* * * * *